United States Patent [19]

Burson

[11] E Patent Number: Re. 31,837

[45] Reissued Date of Patent: Feb. 26, 1985

[54] SINGLE CORE CONDENSER DISCHARGE IGNITION SYSTEM

[75] Inventor: Bob O. Burson, East Longmeadow, Mass.

[73] Assignee: R. E. Phelon Company, Inc., East Longmeadow, Mass.

[21] Appl. No.: 51,983

[22] Filed: Jun. 25, 1979

Related U.S. Patent Documents

Reissue of:

[64] Patent No.: 4,036,201
Issued: Jul. 19, 1977
Appl. No.: 572,908
Filed: Apr. 29, 1975

[51] Int. Cl.[3] ..... F02P 3/06; F02P 3/08

[52] U.S. Cl. ..... 123/601; 123/599

[58] Field of Search ..... 123/149 R, 149 C, 149 D, 123/148 E, 148 CC, 599-602; 315/218, 209 SC, 209 CD; 310/70 R, 153, 156

[56] References Cited

U.S. PATENT DOCUMENTS

| | | | |
|---|---|---|---|
| 3,032,687 | 5/1962 | Penn | 315/218 X |
| 3,484,677 | 12/1969 | Piteo | 123/148 E X |
| 3,500,809 | 3/1970 | Hohne et al. | 123/148 CC |
| 3,545,420 | 12/1970 | Foreman et al. | 123/148 CC |
| 3,553,529 | 1/1971 | Strelow | 123/148 CC |
| 3,598,098 | 8/1971 | Sohner et al. | 123/148 CC |
| 3,667,441 | 6/1972 | Cavil | 123/148 CC |
| 3,669,086 | 6/1972 | Beuk et al. | 123/148 CC |
| 3,703,889 | 11/1972 | Bodig et al. | 123/148 CC |
| 3,704,701 | 12/1972 | Struber et al. | 123/148 CC |
| 3,722,488 | 3/1973 | Swift et al. | 123/148 E X |
| 3,828,754 | 8/1974 | Carlsson | 123/148 CC X |
| 3,851,636 | 12/1974 | Just et al. | 123/148 CC |
| 3,941,111 | 3/1976 | Carmichael et al. | 123/149 C X |
| 3,960,128 | 6/1976 | Anderson et al. | 123/148 CC |

FOREIGN PATENT DOCUMENTS 1325736 1/1963 France .

*Primary Examiner*—Tony M. Argenbright
*Attorney, Agent, or Firm*—Chapin, Neal & Dempsey

[57] ABSTRACT

A breakerless condenser discharge ignition system for an internal combustion engine and excited by a rotating permanent magnet, consists of a single module, containing a number of windings and electrical components, mounted on one pole of a ferromagnetic core for producing high voltage output pulses for firing an associated spark plug.

10 Claims, 8 Drawing Figures

SINGLE CORE CONDENSER DISCHARGE IGNITION SYSTEM

Matter enclosed in heavy brackets [ ] appears in the original patent but forms no part of this reissue specification; matter printed in italics indicates the additions made by reissue.

BACKGROUND OF THE INVENTION

This invention relates to condenser discharge ignition systems for use with spark ignited internal combustion engines, and deals more particularly with improvements in such systems which are excited by a permanent magnet means orbiting in synchronism with the operation of the associated engine.

The ignition system of this invention is particularly useful in association with small single cylinder internal combustion engines of the type commonly used for powering lawn mowers, chain saws, snow blowers and the like. It is therefore shown herein as a unit adapted for use with such single cylinder engines. It should, however, be understood that the invention is not necessarily limited to such application and that it may also be used with multicylinder engines either by providing a distributor between the high tension terminal of the illustrated stator unit and the spark plugs or by providing a plurality of stator units matching the number of plugs.

The small engine market is a relatively competitive one and, therefore, one of the basic purposes of this invention is to provide a relatively low cost and yet reliable ignition system for use with small single cylinder engines. In keeping with this purpose a further object of the invention is to provide a condenser discharge ignition system having a stator unit consisting of a reduced number of parts in comparison with generally similar systems presently available so as to reduce the cost of making the stator unit and to reduce the amount of time and effort required for its assembly with the engine.

Another object of the invention is to provide an ignition system of the foregoing character in which the stator unit is of a relatively small and compact size and requires a minimum number of mechanical and electrical connections for its assembly with the remainder of the engine. In particular, the ignition system of this invention, apart from the rotating magnet, may be made as a single physical stator unit easily mechanically mounted to the stationary structure of an engine and requiring only two electrical connections, one of these electrical connections being a ground connection to the engine structure and the other being a high tension connection from the unit to the associated spark plug. An additional circuit consisting merely of a normally open manually operable switch connected between the unit and ground may also be optionally provided for use in stopping the engine.

Other objects and advantages of the invention will be apparent from the following descriptions and from the drawings forming a part hereof.

SUMMARY OF THE INVENTION

This invention resides in a capacitor discharge ignition system for supplying high voltage power at proper times to the spark plug or plugs of a spark ignited internal combustion engine. The system includes a permanent magnet means which is rotated, as by a flywheel, about a circular path in synchronism with the operation of the associated engine. A core of ferromagnetic material is mounted adjacent the path of the magnet and has one pole or other portion through which a changing amount of flux from the magnet passes each time the magnet moves past the core. All of the windings of the ignition system are wound on the one core portion, these windings being three in number and comprising a primary winding and a secondary winding of a transformer and a charging winding. Since the charging winding and the primary winding are on the same core portion, simultaneous voltage waveforms, each consisting of two half cycles of opposite polarity, are induced in each winding by the changing amount of flux each time the magnet moves past the core. A capacitor is connected by a charging circuit across the charging winding with the charging circuit including a diode poled so that the capacitor is charged during the first half cycle of the voltage waveform induced in the charging winding. A discharging circuit connects the primary winding across the capacitor and includes a silicon controlled rectifier or other normaly nonconducting electronic switch which prevents discharge of the capacitor through the primary winding until the electronic switch is switched to its conducting state. A trigger circuit couples the primary winding with the control or trigger terminal of the electronic switch so that a control or trigger signal is applied to the electronic switch to switch it to its conducting state during the second half cycle of the voltage induced in the primary winding. Preferably, the primary and secondary windings are arranged with one surrounding the other, and the charging winding is spaced from the primary and secondary windings so that during discharge of the capacitor through the primary winding a major amount of the flux linking the primary and secondary windings does not link the charging winding.

The invention also resides in all of the windings and electrical components of the ignition system except for the magnet and spark plug, being contained in a single housing and making up a module mounted on a core of ferromagnetic material so as to form a unit requiring only two external electrical connections, one to ground and one to the spark plug, for operation of the system.

DETAILED DESCRIPTION OF THE PREFERRED EMBODIMENTS

Figure 1:
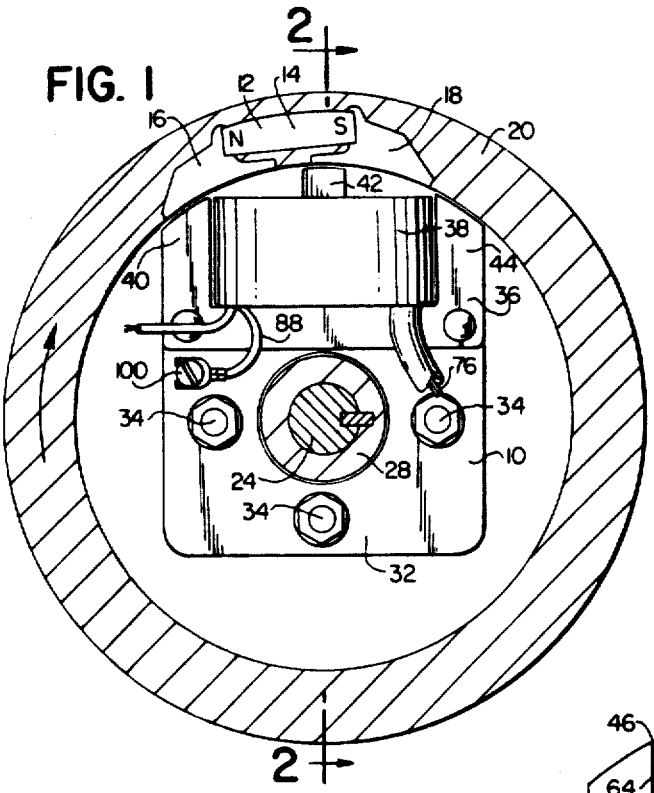
FIG. 1 is a view partly in elevation and partly in section, taken on the line 1—1 of FIG. 2, of a capacitor discharge ignition system embodying this invention.
Figure 2:
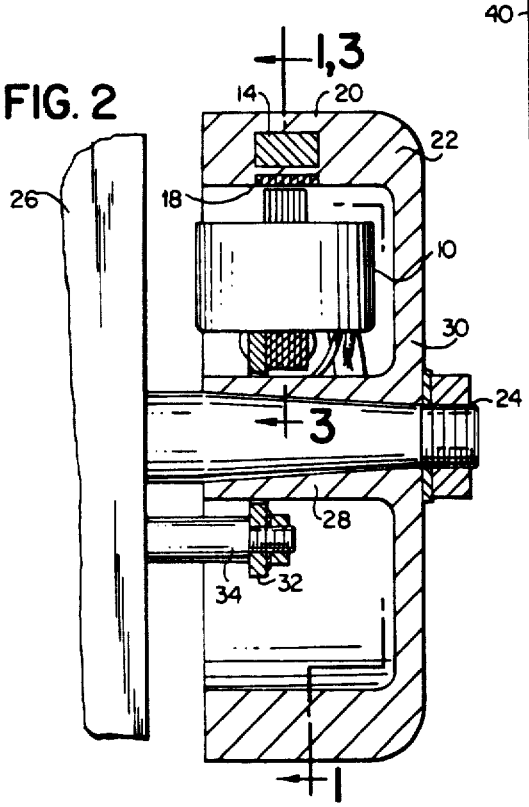
FIG. 2 is a vertical sectional View taken on the line 2—2 of FIG. 1.

Turning to the drawings, and first considering FIGS. 1 and 2, these figures show a stator unit 10 and a permanent magnet assembly 12 comprising, except for an associated spark plug, substantially all of a breakerless condenser discharge ignition system for a single cylinder internal combustion engine.

The permanent magnet assembly 12 is or may be of generally conventional construction consisting of a permanent magnet 14 and two pole pieces 16 and 18. The magnet assembly 12 is molded into the rim 20 of a nonmagnetic flywheel 22 fixed to a shaft 24 of an engine 26 for rotation with the shaft about a circular path. The shaft 24 is a shaft, such as the crankshaft or camshaft, which rotates is synchronism with the operation of the engine so that movement of the magnet assembly 12 past any given point in its circular path is timed in relation to the operating cycle of the engine. In addition to the rim 20, the flywheel 22 includes a hub 28 and a radially extending web 30 between the hub and the rim, the hub, web and rim defining an annular cavity which receives the stator unit 10.

The stator unit 10 includes a base member 32 of nonmagnetic material, having an opening through which the hub 28 and shaft 24 pass, supported from the stationary structure on the engine 26 by three studs 34, 34. The base in turn carries a coil and module assembly consisting of a ferromagnetic core 36 and a winding and component module 38.

Figure 3:
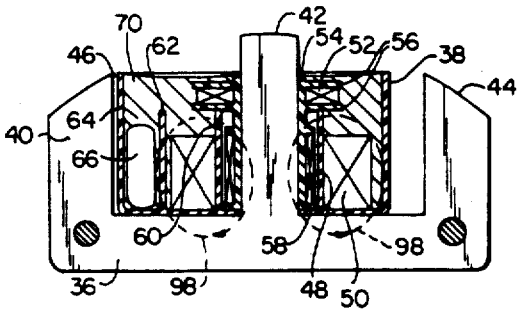
FIG. 3 is an enlarged sectional view taken on the line 3—3 of FIG. 2, through the core and module assembly of the ignition system of FIG. 1.
Figure 6:
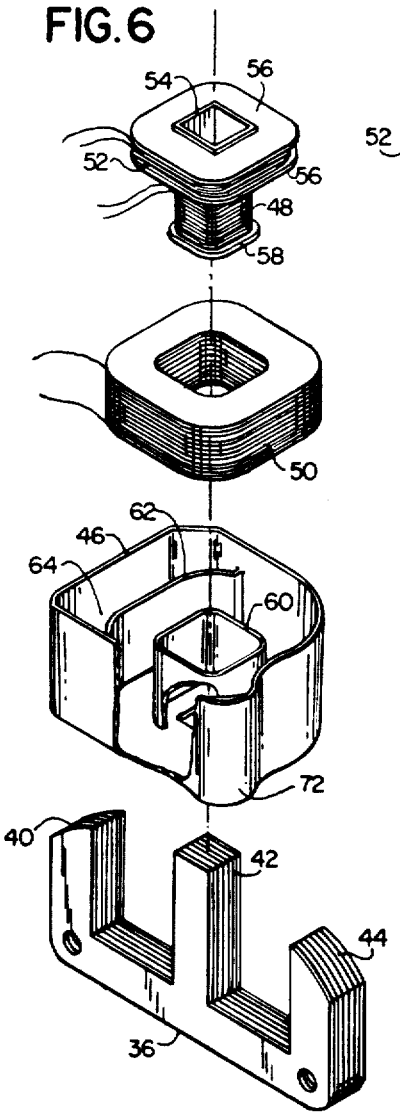
FIG. 6 is an exploded view of the core and module assembly of FIG. 3.

FIGS. 3 and 6 show in detail the construction of the core 36 and the winding and component module 38. Referring to these figures, the core 36 is a ferromagnetic flux conducting member, made of laminated iron, having at least one portion in which a changing magnetic flux is created as the magnet assembly moves past the core, and the module 38 is located on the core so as to surround such portion. In particular, the core 36 is one having three poles 40, 42 and 44 spaced from one another along the circular path of the magnet assembly 12. From FIG. 1, it will be understood that as the magnet assembly 12 moves past the core 36, the flux in the middle pole 42 is first in one direction, as the pole piece 18 passes thereover, and is then in the other direction, as the pole piece 16 passes thereover.

The module 38 is mounted on the middle core pole 42. It includes a thin walled cup-shaped housing 46 made of a plastic material and containing three electrical windings. These windings are a transformer primary winding 48, a transformer secondary winding 50 and a charging winding 52. The primary winding 48 and charging winding 52 are wound on a plastic bobbin 54 initially separate from the housing 46. The bobbin has two radially extending flanges 56, 56 between which the charging winding 52 is located and two other radially extending flanges 58, 58 between which the primary winding 48 is located.

Figure 4:
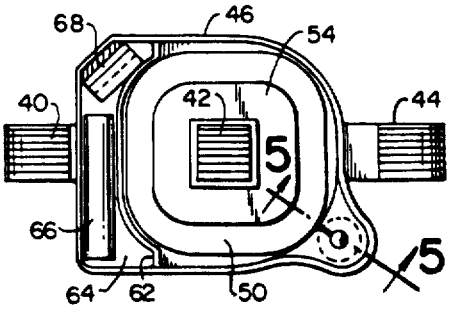
FIG. 4 is a top view of the core and module assembly of FIG. 3 with the potting material being shown removed from the module housing.

The module housing 46 includes an axially extending chimney portion 60 within which that portion of the bobbin 54 containing the primary winding 48 is contained. The secondary winding 50 surrounds the chimney 60 so as to also surround the primary winding 48. The bobbin 54 has a central opening extending completely therethrough and of a square cross section conforming to the square cross section of the pole 42. As shown in FIGS. 3 and 4, the housing 46 includes an intermediate wall 62, to the left of the secondary winding 50, forming a pocket 64 for receiving a condenser 66, a silicon controlled rectifier 68 and other electrical components shown hereinafter in the schematic diagram of FIG. 7.

Figure 7:
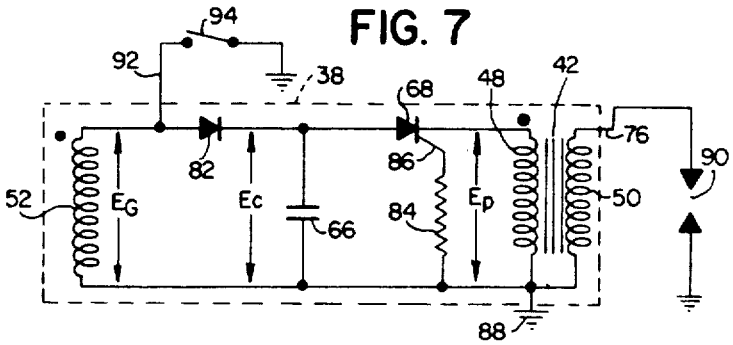
FIG. 7 is a schematic wiring diagram of the ignition system of FIG. 1.

The components contained in the pocket 64, the primary winding 48, the secondary winding 50 and the charging winding 52 are electrically connected with one another, as in the wiring diagram of FIG. 7, by suitable leads contained within the housing 46. Also, the three windings, the components in the pocket 64, the bobbin 54 and the housing 46 are all mechanically fixed relative to one another by a potting material 70 filling the otherwise empty space of the housing. The module 38 is suitably mechanically fixed to the pole 42 as by an adhesive between the interior surface of the bobbin 54 and the pole 42.

Figure 5:
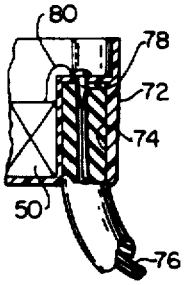
FIG. 5 is an enlarged fragmentary sectional view taken on the line 5—5 of FIG. 4.

As shown best in FIGS. 4 and 5, the module housing 46 also includes a portion 72 defining a socket 74 for receiving the end portion of an insulated high tension conductor 76 for connecting the module to an associated spark plug. At the inner end of the socket 74 is a tack 78 connected to the high tension end 80 of the secondary winding 50 for making electrical contact with the end of the conductor 76 received in the socket 74.

Referring to FIG. 7, the charging winding 52 is connected across the capacitor 66 by a charging circuit including a diode 82. The capacitor 66 is also connected across the primary winding 48 by a discharging circuit including the silicon controlled rectifier (SCR) 68. The SCR 68 is normally nonconducting and acts as an electronic switch for preventing discharge of the capacitor 66 through the primary winding 48 until it is triggered or switched to a conducting state.

The triggering circuit for the SCR 68 is coupled with the primary winding 48 so that the voltage induced in the primary winding 48, as the magnet assembly moves past the core 36, is utilized to provide a trigger signal for the SCR, thereby eliminating the need for a separate additional trigger winding. This trigger circuit in turn consists merely of a resistor 84 connected between one end of the primary winding 48 and the gate or control terminal 86 of the SCR 68.

Still referring to FIG. 7, the charging winding 52 and the primary winding 48 are wound and so located on the pole 42 so that the ends thereof marked by the dots are of common polarity. Also, one end of the coil 48, one end of the resistor 84, one end of the capacitor 66, one end of the charging winding 52 and one end of the secondary winding 50 are all connected to ground by the line 88. The ungrounded or high tension end of the secondary winding 50 is connected to the high tension terminal of the associated spark plug 90 by the line 76. Additionally, the system of FIG. 7 may include an additional circuit consisting of a line 92 connected to ground through a normally open manually operable switch 94. The switch 94 is useful in stopping the operation of the engine since when the switch 94 is closed it shorts out the charging winding 52 to prevent charging of the capacitor 66 and consequent firing of the plug 90.

Figure 8:
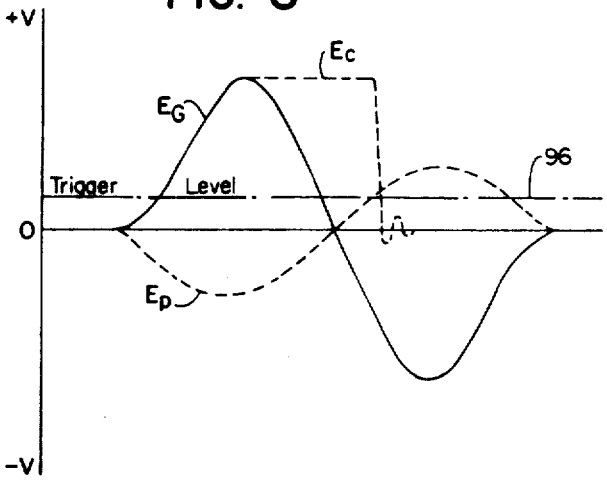
FIG. 8 is a graph illustrating voltage waveforms appearing across various parts of the ignition system of FIG. 1 during one passage of the magnet past the core.

In considering the operation of the system of FIG. 7, reference may be had to FIG. 8 which shows the waveforms of the voltages appearing across the charging winding 52, across the primary winding 48 and across the condenser 66 during one passage of the magnet assembly 12 past the core 36. In FIG. 8, $E_g$ is the voltage as seen by diode 82 induced in the charging winding 52 by the magnet assembly and $E_p$ is the voltage induced in the primary winding 48 by the magnet assembly as seen by gate 86 of the SCR. $E_c$ is the voltage across the capacitor. Each of the waveforms $E_g$ and $E_p$ occur simultaneously and each includes two half cycles of opposite polarity. The diode 82 is so poled that during the first half cycle of the voltage waveform $E_g$ induced in the charging winding 52 the capacitor 66 is charged. The charge on the capacitor is held into the next half cycle of the voltage waveform $E_g$ until the voltage $E_p$ rises, in the second half cycle thereof, to a level sufficient to cause triggering of the SCR 68. In FIG. 8, the line 96 represents the triggering level which the voltage $E_p$ needs rise to to cause triggering of the SCR 68. When the voltage $E_p$ does reach the triggering level, the SCR is triggered to its conducting state and the condenser 66 is discharged through the primary winding 48 to induce a high output voltage across the secondary winding 50 which fires the associated spark plug 90.

When the capacitor 66 is discharged to cause firing of the spark plug 90 the capacitor discharge current flowing through the primary winding 48 sets up a changing magnetic flux in the pole 42, indicated by the broken lines 98, 98 of FIG. 3 which link the primary and secondary windings. It is desirable that this flux not link the charging winding 52 since, if it does, the charging winding 52 will act as a shorting coil and impair the generation of the high voltage output in the secondary winding 50. Therefore, as shown in FIG. 3, the charging winding 52 is preferably spaced a substantial distance along the length of the pole 42 from the primary winding 48 and secondary winding 50 so that a major portion of the flux which does link the primary and secondary windings during capacitor discharge will not link the charging winding 52.

It will also be noted from FIG. 1 and FIG. 7 that, apart from the stop switch circuit which is optional, the only electrical connections required for the module 38 are the ground connection made by the line 88 and the high tension connection to the spark plug made by the conductor 76. The grounding of the line 88 may be accomplished in various different ways, and in FIG. 1 is shown to be accomplished by connecting the free end of the line 88 to the base 32 by a screw 100, the base 32 being made of an electrically conductive material and being electrically connected to the engine 26 through the studs 34, 34.

I claim:

1. A capacitor discharge system for an internal combustion engine comprising a permanent magnet means rotated about a circular path in synchronism with the operation of said engine, a core of ferromagnetic material mounted adjacent said circular path and having one portion providing a path for the varying flux generated by the movement of said magnet means past said core, a charging winding and a transformer core portion, said charging winding being offset from said primary and secondary windings radially with respect to said circular path; said charging winding and primary winding being wound on said one core portion such that the voltages induced therein by said varying flux each includes half wave voltages of opposite polarity, a charging circuit including a capacitor connected across said charging winding and a diode poled to pass half wave voltages of one polarity for charging said capacitor and maintaining said capacitor charged when the voltage generated in said charging winding is opposite said one polarity, circuit means connecting said capacitor with said primary winding for discharging said capacitor through said primary winding and including an electronic switch means having anode, cathode and control electrodes, the anodecathode junction of said switch means interconnecting the ends of said charging winding and said primary winding which are simultaneously at the same polarity, said control electrode being connected to the other end of said primary winding, the polarity of which is opposite said same polarity, said switch means being nonconductive during the charging of said capacitor by said one polarity of the voltage generated in said charging coil and being rendered conductive by voltage generated in the primary winding opposite said same polarity whereby said capacitor is charged during one complete half cycle of voltage generated in the charging coil and discharged during the next half wave voltage generated in said charging winding.

2. A capacitor discharge system for an internal combustion engine as set forth in claim 1 in which said control electrode is connected by circuit means to the ends of both said primary winding and charging winding opposite to the ends of these windings interconnected by the cathode-anode junction of said electronic switch means.

3. A capacitor discharge system as set forth in claim 2 in which said circuit means connecting the control electrode to said primary and charging winding includes a resistor.

4. A capacitor discharge system as set forth in claim 3 in which said electrode switch means is a silicon control rectifier and the control electrode thereof is the gate of said rectifier, said gate electrode and the ends of said charging winding and primary winding opposite said same polarity being connected to ground potential.

5. A capacitor discharge system as defined in claim 3 further characterized by a thin walled cup-shaped housing received on said one portion of said core of ferromagnetic material and containing said primary winding, said secondary winding, said charging winding, said capacitor, and said electronic switch, and an insulated high tension conductor for connecting one end of said secondary winding to said spark plug, said housing also having a socket for receiving one end of said high tension conductor and means in said socket for making electrical connection between said one end of said conductor and one end of said secondary winding.

*6. In a capacitor discharge system for an internal combustion engine having permanent magnet means rotatable about a circular path in synchronism with the operation of said engine, a charge coil, a capacitor connected in circuit with said charge coil and an electronic switch means which is rendered conductive in response to a trigger pulse connected to said switch means for discharging said capacitor into the primary winding of a transformer ignition coil, the secondary winding of said transformer being connected to a spark gap device for said engine, the improvement in said system comprising an integral core of ferromagnetic material which includes a plurality of circumferentially spaced, radially extending leg portions disposed adjacent said circular path, one of said leg portions providing a path for varying flux generated by the movement thereby of said magnet means, said charge coil being connected to charge said capacitor and together with said transformer coil being disposed on said one leg portion, said charge coil and transformer coil being offset radially with respect to the circular path of said magnet means, said coils being wound such that voltages simultaneously induced therein by said varying flux in said one leg portion include half wave voltages*

*of opposite polarity, said capacitor being charged by voltage of one polarity generated in said charge winding and said electronic switch means being rendered conductive by a trigger voltage the same as said one polarity which occurs during generation in the charge winding of a voltage opposite said one polarity which charges said capacitor whereby said capacitor is charged during one half cycle of voltage induced in the charging coil by changing flux in said one leg portion and discharged during the next half cycle of voltage induced in one of said coils by said changing flux in said one leg portion.*

*7. In a capacitor discharge ignition system as set forth in claim 6 wherein said charge coil is offset from said transformer coil in the direction of said rotating magnet means.*

*8. In a capacitor discharge ignition system as set forth in claim 6 wherein said core has three radially extending leg portions with said charge coil and said transformer coil disposed on the center leg portion of said core.*

*9. In a capacitor discharge system for internal combustion engines as set forth in claim 6 wherein said charge coil and transformer coils are essentially the only voltage generating coils employed in said system whereby capacitor charging, the electronic switch means triggering and the transformer ignition functions are all performed by said charging coil and transformer coil in the absence of a separate trigger coil.*

*10. In a capacitor discharge ignition system as set forth in claim 7 wherein said transformer coil includes a primary winding and secondary winding disposed in generally concentric relation on said one leg portion, said charge coil being offset a substantial distance from the secondary winding of the transformer coil.*

* * * * *